United States Patent [19]

Lessner et al.

[11] 4,054,812
[45] Oct. 18, 1977

[54] INTEGRALLY FOCUSED LOW OZONE ILLUMINATOR

[75] Inventors: David L. Lessner, Baltimore; James H. Macemon, Glen Burnie; Rodolfo Rodriguez, Columbia; Charles Soodak, Silver Spring, all of Md.

[73] Assignee: Baxter Travenol Laboratories, Inc., Deerfield, Ill.

[21] Appl. No.: 687,861

[22] Filed: May 19, 1976

[51] Int. Cl.² ............................................. H01J 61/40
[52] U.S. Cl. ....................................... 313/44; 313/45; 313/111; 313/112; 362/263; 362/318
[58] Field of Search ................. 240/41 R; 313/27, 44, 313/45, 47, 110, 111, 112

[56] References Cited
U.S. PATENT DOCUMENTS 3,949,258   4/1976   Soodak .................................. 313/25

*Primary Examiner*—Rudolph V. Rolinec
*Assistant Examiner*—Darwin R. Hostetter
*Attorney, Agent, or Firm*—Henry W. Collins; Richard G. Kinney

[57] ABSTRACT

A high pressure xenon arc illuminator bulb having a sapphire window generates a broad band of ultraviolet, visible and infrared radiation extending from about 180 nanometers to about 2000 nanometers.

The emitted radiation in the range from about 180 to about 200 nanometers, in passing through the oxygen in the air, causes the molecules of oxygen in the form $O_2$ to recombine to produce ozone, $O_3$. Ozone is toxic.

In the invention, a lens barrel, which holds a sapphire condensing lens, is joined to the xenon arc illuminator bulb with a lighttight and also hermetic connection. Thus, the condensing lens is optically rigid with the illuminator bulb and the ozone formed within the lens barrel is not released to the ambient environment, even though its local concentration within the lens barrel becomes high. Furthermore, the ozone confined within the lens barrel acts as an absorption filter for all of the wavelengths in the 180 to 200 nanometer band which are capable of producing ozone.

The ultraviolet and other radiation leaving the sapphire condensing lens therefore does not produce toxic ozone in the ambient environment.

6 Claims, 2 Drawing Figures

INTEGRALLY FOCUSED LOW OZONE ILLUMINATOR

CROSS REFERENCE TO RELATED APPLICATIONS

The instant invention is a further development of an earlier invention, disclosed in U.S. Pat. No. 3,949,258 entitled, "Method and Means for Suppressing Ozone Generated by Arc Lamps" by Charles Soodak, issued on Apr. 6, 1976.

BRIEF SUMMARY

The use of high pressure gaseous discharge arc lamps as illuminators in ultraviolet spectroscopy is common. In those instances where the extreme ultraviolet region is of interest, commercially available illuminator bulbs, which emit radiation down to 180 nanometers, are used.

The emitted radiation below 200 nanometers causes the oxygen of the air, which is in the diatomic molecular state ($O_2$), to react to form triatomic molecules of ozone ($O_3$). Ozone is a toxic gas and there are OSHA regulations which limit its concentration.

In the past the unwanted ozone has been eliminated by the use of ventilating hoods and deozonizers.

More recently the above-identified copending application by Charles Soodak has disclosed the use of a hermetically sealed housing with a sapphire exit window for housing an extreme ultraviolet radiation source. The inside of the lamp housing, during operation, attains a high concentration of ozone, but, since the lamp housing is hermetically sealed, this ozone is not released to the ambient atmosphere. Furthermore, the ozone within the lamp housing, in a manner similar to that of the ozone in the stratosphere, acts as an absorption filter for those wavelengths of emitted radiation which could produce ozone. Thus, ultraviolet light of such wavelengths as are capable of producing ozone do not escape from the lamp housing.

The instant invention is a further development of the Charles Soodak concept, in that the condensing lens barrel is physically united with an ultraviolet illuminator bulb, in both a mechanically rigid and hermetic sense. Thus, the ozone inside the lens barrel acts as the required absorption filter and the optical rigidity of the system is good. Furthermore, it is not necessary to hermetically seal the large lamp house within which the illuminator bulb is situated.

The amount of ozone produced in the ambient air by radiation coming from an ultraviolet illuminator in accordance with this invention is so low as to be well within permissible OSHA limits.

VIEWS OF DRAWING

FIG. 1 is a cross-sectional view, illustrating the invention while

DETAILED DESCRIPTION

Figure 1:
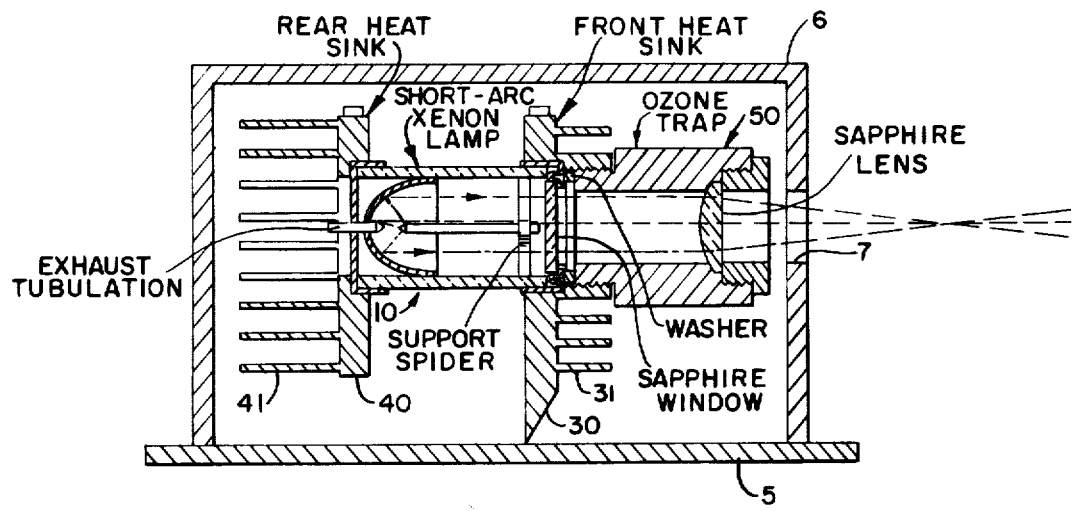
Figure 2:
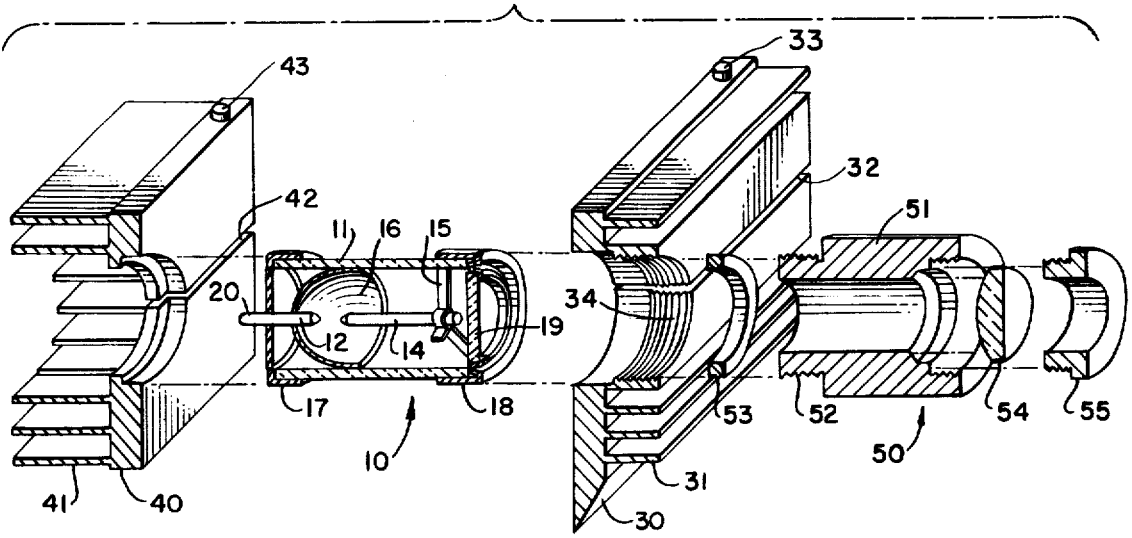
FIG. 2 is a perspective exploded view, illustrating a portion of the parts of FIG. 1.

In FIG. 1 the lamp house 6, supported on a base 5, has an opening 7 for the exit of radiation from illuminator bulb 10.

The opening 7 is not sealed against passage of air, and the housing is provided with other openings, not shown, for free circulation of cooling air.

The illuminator bulb 10 is a readily available miniature high pressure xenon short-arc device. It includes a ceramic body 11, having rear and front electrodes 12 and 14. The front electrode 14 is supported by spider 15 while the rear electrode 12 projects to the rear as an exhaust tubulation 20. A parabolic reflector 16 of evaporated aluminum focuses many of the rays from the short arc between electrodes 12 and 14 into a parallel beam, which exits sapphire window 19. Rings 17 and 18 of metal encircle the rear and front edges of the illuminator bulb 10.

A typical illuminator bulb, made by Varian, burns at 300 watts in a volume about 1¼ inches in diameter and about 1⅛ inches long. Most of this energy must be dissipated by the casing of the illuminator bulb, since only a minor amount leaves in the parallel beam through sapphire window 19. Accordingly, the casing gets very hot. Front heat sink 30 and rear heat sink 40 are provided to prevent overheating of the illuminator bulb 10.

Front heat sink 30 has cooling fans 31 and is clamped onto the front metal ring 18 of illuminator bulb 10 by slightly closing the radial split 32 by tightening clamping screw 34.

Similarly, rear heat sink 40 has cooling fins 41 and is clamped to the rear metal ring 17 of illuminator bulb 10 by slightly closing the radial split 42 by tightening clamping screw 43.

The ozone trap 50 consists of a lens barrel 51 which is screwed, by means of male threads 52, into the female thread 34. The left face of lens barrel 52, which is machined accurately square to the axis of threads 34,52, bears against parallel sided washer 53, which, in turn, bears against the radial face of front metal ring 18 of the illuminator bulb 10.

In assembling the parts, after clamping screw 33 is slightly tightened to slightly clamp front ring 18, the lens barrel 51 is screwed in until its shoulder seats on the heat sink. In advancing, the lens barrel pushes washer 53 slightly to the left, and thus displacing front ring 18 slightly to the left. The result is that the front metal ring 18, washer 53 and the left end of the lens tube are in uniform metal to metal contact. A final tightening of clamping screw 33 then locks both the front metal ring 18 of illuminator bulb 10 and the lens barrel securely.

While the illustrated preferred embodiment utilizes a parabolic reflector 16 to produce a radiant beam at sapphire window 19 which is largely parallel rayed, and uses a condensing lens 50 to focus the parallel rays to a small region, it is to be understood this is illustrative. Those skilled in the art will be aware of obvious alternative expedients. The sapphire condensing lens 54 can be replaced with a negative power lens if a large area is to be illuminated. Or the sapphire condensing lens 54 can be replaced with a parallel sided sapphire window. The parabolic reflector 16 can be replaced with an elliptical reflector. With lesser amounts of power inputed into the illuminator bulb 10, the heat sinks can be modified or not used. For example, an enlarged lens barrel, provided with integral fins, may envelope the cylindrical circumference of the illuminator bulb 10.

The airtight seals of ozone trap 50 may include elastomeric seals, such as silicone rubber.

The bore of the ozone trap 50 in the preferred embodiment is filled with air. Oxygen could be substituted, especially if the length of the ozone trap had to be greatly shortened.

In a prototype of the preferred embodiment, the internal longitudinal length of the ozone trap, from window 19 to lens 54, was slightly more than 1¼ inches. It was found that this length of absorption cell was sufficient to substantially strip from the emitted ultraviolet rays those wavelengths which produce ozone. With 300 watts of energy inputed into the illuminator bulb 10, the ozone produced in the ambient air by the ultraviolet light which was emitted from sapphire condensing lens 54 was so low that it was difficult to measure, and in any event, lower than the amount permitted in the work place by OSHA regulations.

We claim:

1. An integrally focused low ozone illuminator comprising:
   a source of radiant ultraviolet radiation comprising an opaque body and a window transparent to ultraviolet radiation, through which window the ultraviolet radiation is emitted;
   an ozone trap comprising an opaque barrel having a longitudinal bore therethrough;
   means for clamping the rear end of said barrel to the opaque portion of said source of radiant ultraviolet radiation, with the said bore about said window, so that the joint between said opaque portion and said barrel is substantially lighttight, airtight and rigid and so that the said window admits said ultraviolet radiation to the bore of said barrel;
   window means, transparent to some of the emitted radiation, for closing the fore end of said barrel with a substantially airtight joint;
   whereby ozone produced within said barrel by the ultraviolet radiation is kept confined within said barrel, wherein it acts as an absorption filter; and,
   whereby the mechanical combination of said source of radiant ultraviolet radiation and said ozone trap forms a rigid, unitary, optical component.

2. Subject matter under claim 1 in which
   said window means for closing the fore end of the barrel is a lens.

3. Subject matter under claim 2 in which
   said lens for closing the fore end of the barrel is made of sapphire.

4. Subject matter under claim 1 in which
   said window means for closing the fore end of the barrel is made of sapphire.

5. Subject matter under claim 1 in which
   said barrel acts as a heat sink for the portion of the body of said source of radiant ultraviolet radiation against which said barrel is clamped.

6. Subject matter under claim 1 in which
   said means for clamping the rear end of said barrel to the opaque portion of said source of radiant ultraviolet radiation also acts as a heat sink for said source.

* * * * *